Figure 1:
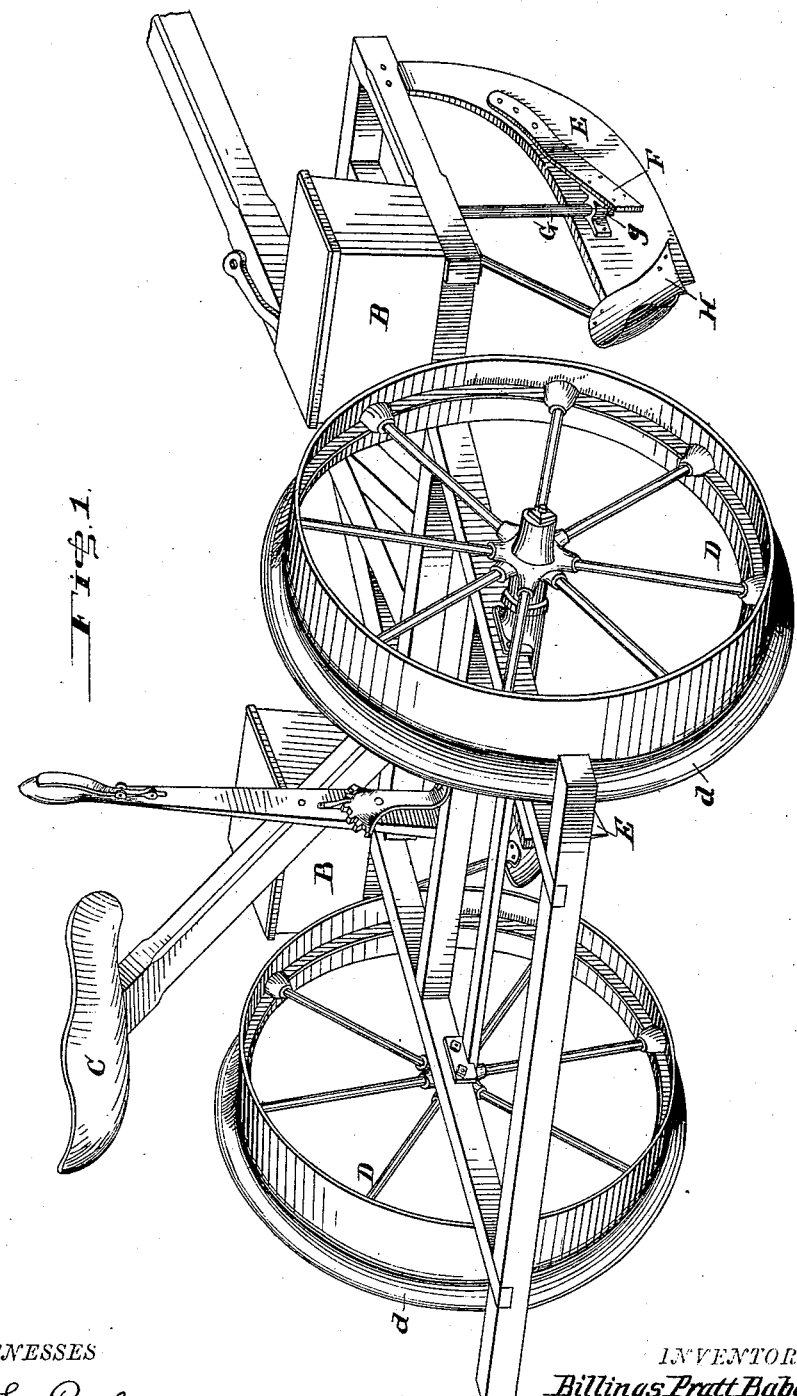

(No Model.)
2 Sheets—Sheet 2.

B. P. BABCOCK.
CORN PLANTER.

No. 304,399.   Patented Sept. 2, 1884.

WITNESSES
C. J. Beer.
Oscar Nauck.

INVENTOR
Billing Pratt Babcock,
By Paine & Ladd,
Attorneys.

United States Patent Office.

B. PRATT BABCOCK, OF PONTIAC, ILLINOIS.

CORN-PLANTER.

SPECIFICATION forming part of Letters Patent No. 304,399, dated September 2, 1884.

Application filed May 14, 1884. (No model.)

*To all whom it may concern:*

Be it known that I, BILLINGS PRATT BABCOCK, a citizen of the United States, residing at Pontiac, in the county of Livingston and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the class of corn-planting machines which drop the seed, and then, by compression or otherwise, make a covering for the same. Heretofore the common practice has been to plant corn in a cut or trench, and then to cover it and compress the earth above it, and the great majority of corn-planters in general use operate on this principle. For example, one common type of planter has a runner which makes an incision or cut in the ground, into which the seed is deposited by means of a seed-tube which extends down into the heel of the runner, and the traction-wheels of the machine close up the cut. In another type a trench is formed and the seed is dropped into the bottom of the same, and then covered by a covering-wheel which turns one wall of the trench over against and onto the seed; but in all cases, so far as I am aware, a trench, cut, incision, or hole of some kind is first made and the seed dropped into it.

My invention embodies a new and different principle—viz., deposits the seed on level ground, and then turns a furrow over the seed and compresses the walls of the furrow so as to form a well-defined and even trough parallel with the line of seed, but lower than the same. In this way I secure a good seed-bed and perfectly uniform planting, because the thickness of the covering of earth over the seed is always the same. The ground is first leveled off and the depth of the cut of the plow below this leveled surface is constant; consequently the thickness of the layer of earth turned over onto the level surface must be uniform. Moreover, the seeds, being dropped onto a flat surface, are all on a level, instead of being dropped on top of each other or deposited at different depths along the slanting walls of a trench; and, finally, a great benefit is derived from the drainage-furrow, for, the same being invariably lower than the seed, it forms a receptacle for and drains off surplus water.

My invention therefore consists of a machine operating in the manner suggested, which will be hereinafter fully described, and then set forth in the claims.

Figure 2:
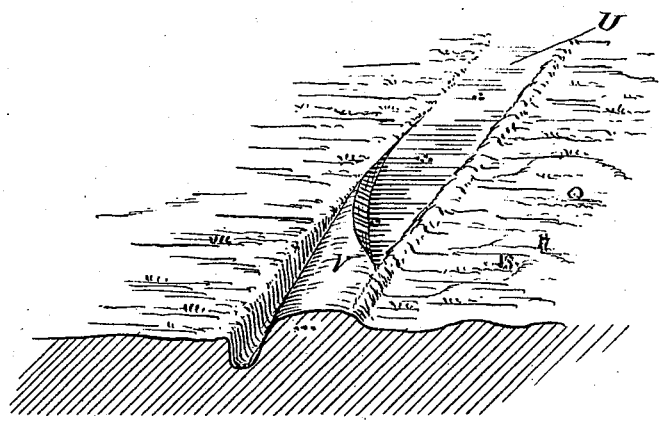
Figure 3:
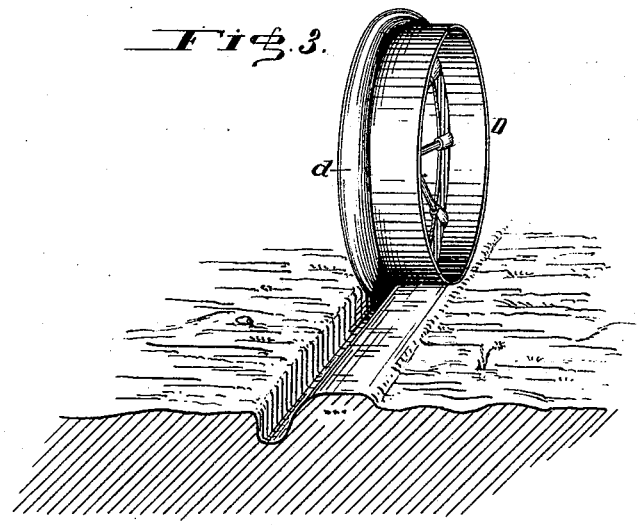

Figure 1 is a perspective view of a machine constructed according to my invention, and Figs. 2 and 3 illustrate the several operations which it performs.

In the present case I have shown my invention applied to a two-horse planter adapted to plant two rows of corn. The seed-dropping mechanism, the planter-frame, &c., may be of any preferred construction. Those things do not constitute any part of my invention. It will also be understood that it is immaterial whether the planter be constructed to plant one, two, or more rows.

The frame A of the planter carries the seed-boxes B, seat C, the necessary devices for operating the seeding mechanism, raising the planting mechanism, &c., and the traction and gutter-forming wheels D. These wheels have broad flat tires with an oval rim or flange, d, projecting from the same near one edge. This oval rim may be described as a large half-round or half-oval hoop placed near one edge of a common planter-wheel, and of a size sufficient to support the weight of the planter and driver. Immediately in front of each wheel, and in line with the outer edge of the oval rim of the same, there is a thin colter-runner, E, which is properly attached to the frame. Attached to the side of this runner, and projecting out therefrom and in a rearward direction, there is a scraper-blade, F, or "gopher," as it is sometimes called. This blade is set so that it comes just at the surface of the ground, and it levels off the same, removes all lumps of dirt and weeds, and leaves a smooth strip of ground, as shown by U, Fig. 2, for a seed-bed. The earth removed by the scraper-blade is swept by it to one side. The seed-tube G comes down between the gopher-blade and the runner just in rear of the former, and it is located so that its end comes over the center of the level path cleared by the gopher. The brace g, which sustains the end of the gopher, may also form a guide for the end of the seed-tube.

At the heel of the runner there is attached a small plow, H, the landside of the same being in line with the runner, and the moldboard being on the same side as the seed-tube and gopher, so that the plow will turn its furrow over onto the seed, as shown at V in Fig. 2. The bottom of the runner extends a little below the bottom of the plow, in order that it may effectually cut all weeds and cornstalks and steady the plow.

It will be observed that the plow and runner can be made of one piece or plate of metal, the proper contour being given to the rear part of the runner to cause it to act as a moldboard.

The operation of the devices is as follows: The gopher first levels off the ground. The seed is immediately dropped upon the smooth surface, and then the plow turns its small furrow-slice over onto the seed, as illustrated by Fig. 2. The traction-wheel, with its raised rim, now finishes the work. The projecting rim, which sustains almost the entire weight, traveling in the furrow, presses down the earth and forms a smooth well-defined gutter, while the inferior part of the rim of the wheel travels on top of the seed and compacts the earth above it.

There are many particulars in which the above-described machine may be varied without departing from the spirit of my invention, and I do not confine myself to the precise arrangement and construction of parts herein shown and described. For example, a knife-colter or a rotary disk-colter can be substituted for the runner, and a rotary disk plow or harrow will do the same work as the moldboard plow herein shown. The invention is also applicable to the planting of other seeds than corn, and is not necessarily restricted to the latter.

In the illustration of my machine it will be seen that the projecting rims of the two wheels are on the same side, and consequently that both plows turn their furrows in the same directions; but it is also common in double planters to have the parts of the two mechanisms reversed, and the same may be done in this case. The raised rims of the wheels would then both be on the inner sides, and the lateral pressure of the plows would counterbalance each other.

Having thus fully shown and described my invention and the best mode of practicing the same, what I claim as new, and desire to secure by Letters Patent, is—

1. In a planter, a furrow-forming device adapted to form a drainage-furrow in close proximity to the seed mound or hill and compress or compact the earth within the area of said drainage-furrow, substantially as and for the purpose set forth.

2. In a planter, a furrow-forming wheel having a rim which forms a drainage-furrow in close proximity to the seed mound or hill, substantially as and for the purpose set forth.

3. In a planter, the combination of a ground-leveling device, seed-dropping mechanism, which deposits the seed on the level seed-bed, and a covering-plow which turns a furrow-slice over onto the seed, substantially as and for the purpose set forth.

4. In a planter, the combination of a ground-leveling device, seed-dropping mechanism which deposits the seed on the level seed-bed, a covering-plow which turns a furrow-slice over onto the seed, and a wheel having a projecting rim which compresses the walls of the furrow, substantially as and for the purpose set forth.

5. In a planter, the combination of a colter-runner, E, gopher F, and seed-tube G, substantially as and for the purpose set forth.

6. In a planter, the combination of a colter-runner, E, gopher F, seed-tube G, and the covering-plow H, arranged and operating substantially as described, and for the purpose set forth.

7. In a planter, the combination of the colter-runner E, gopher F, seed-tube G, the covering-plow H, and the furrow-compressing wheel D, having projecting rim d, arranged and operating substantially as described, and for the purpose set forth.

8. In a planter, the combination, with a plow which forms a furrow adjacent to the line of seed, of a wheel having a projecting rim which travels in the furrow and compresses and smooths the bottom of the same, substantially as and for the purpose set forth.

In testimony whereof I affix my signature in presence of two witnesses.

B. PRATT BABCOCK.

Witnesses:
 STORY B. LADD,
 C. T. BELT.